Dec. 20, 1949     J. H. STEES     2,491,780
HOISTING AND DUMPING VEHICLE

Filed Sept. 10, 1948     4 Sheets-Sheet 1

Joseph H. Stees
INVENTOR.

BY Clarence A. O'Brien
and Harvey B. Jacobson
Attorneys

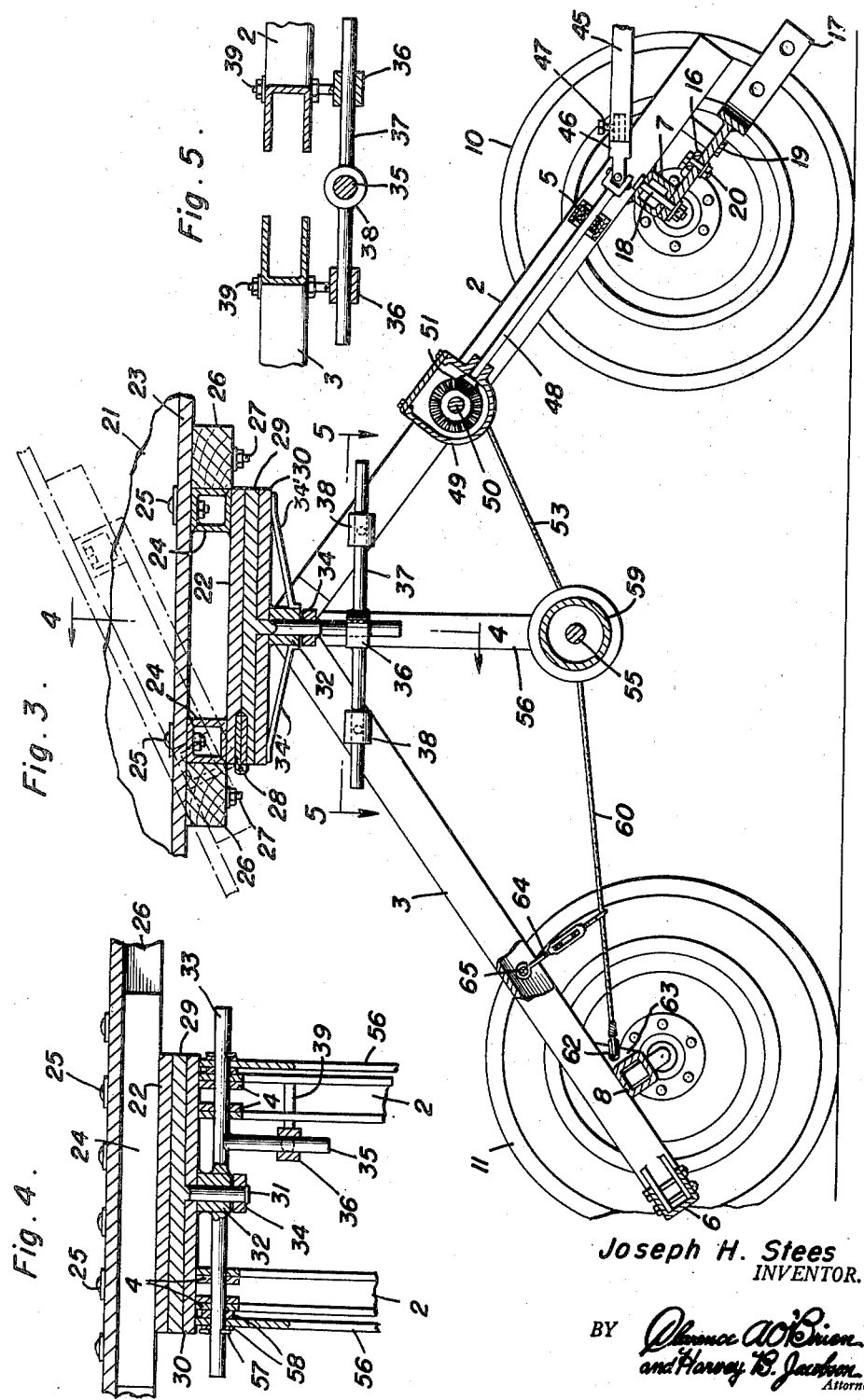

Dec. 20, 1949 J. H. STEES 2,491,780
HOISTING AND DUMPING VEHICLE
Filed Sept. 10. 1948 4 Sheets-Sheet 3

Inventor
Joseph H. Stees
By *Clarence A. O'Brien
and Harvey B. Jacobson*
Attorneys Dec. 20, 1949  J. H. STEES  2,491,780
HOISTING AND DUMPING VEHICLE
Filed Sept. 10, 1948  4 Sheets-Sheet 4

Joseph H. Stees
INVENTOR.

BY
Attorneys

Patented Dec. 20, 1949

2,491,780

UNITED STATES PATENT OFFICE 2,491,780

HOISTING AND DUMPING VEHICLE

Joseph H. Stees, Freeport, Ill.

Application September 10, 1948, Serial No. 48,577

9 Claims. (Cl. 298—11)

My invention relates to improvements in hoisting and dumping vehicles of the revolving tilting body type.

The primary object of my invention is to provide a simply constructed vehicle of the character indicated for towing by a tractor and which is equipped for elevating a load and dumping the same forwardly or rearwardly of the vehicle, or to either side thereof, at various angles.

Another object is to provide a vehicle of the character and for the purpose above set forth which is inexpensive to use, operate and service and which will withstand rough, heavy duty without getting out of order.

Other and subordinate objects, within the purview of my invention, together with the precise nature of my improvements, will be readily understood when the succeeding description and claims are read with reference to the drawings accompanying and forming a part of this specification.

In said drawings:

Figure 3 is a fragmentary view in longitudinal section of the same drawn to an enlarged scale and illustrating, in broken lines, the body tilted in one direction longitudinally of the vehicle;

Figure 4 is a fragmentary view in vertical section taken on the line 4—4 of Figure 3;

Figure 5 is a view in horizontal section taken on the line 5—5 of Figure 3;

Figure 1:
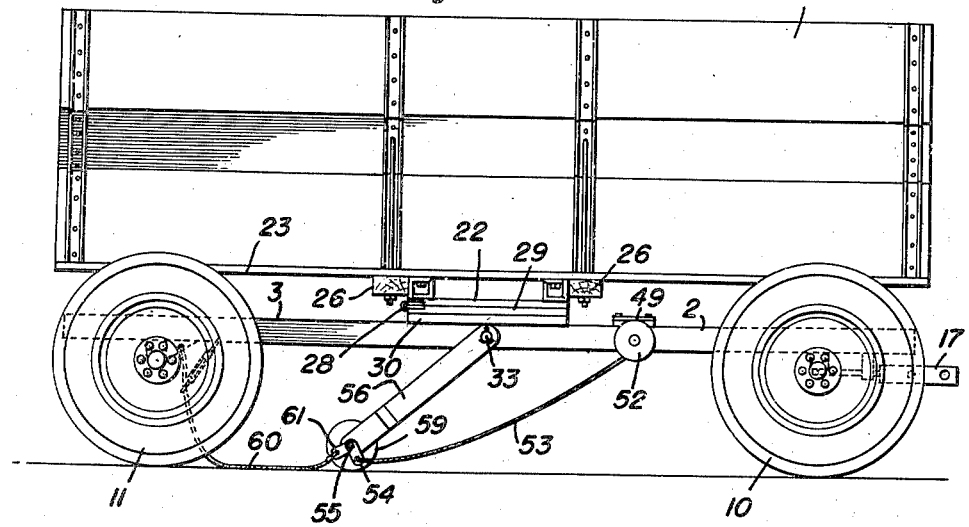
Figure 1 is a view in side elevation of my improved hoisting and dumping vehicle in a preferred embodiment thereof.
Figure 2:
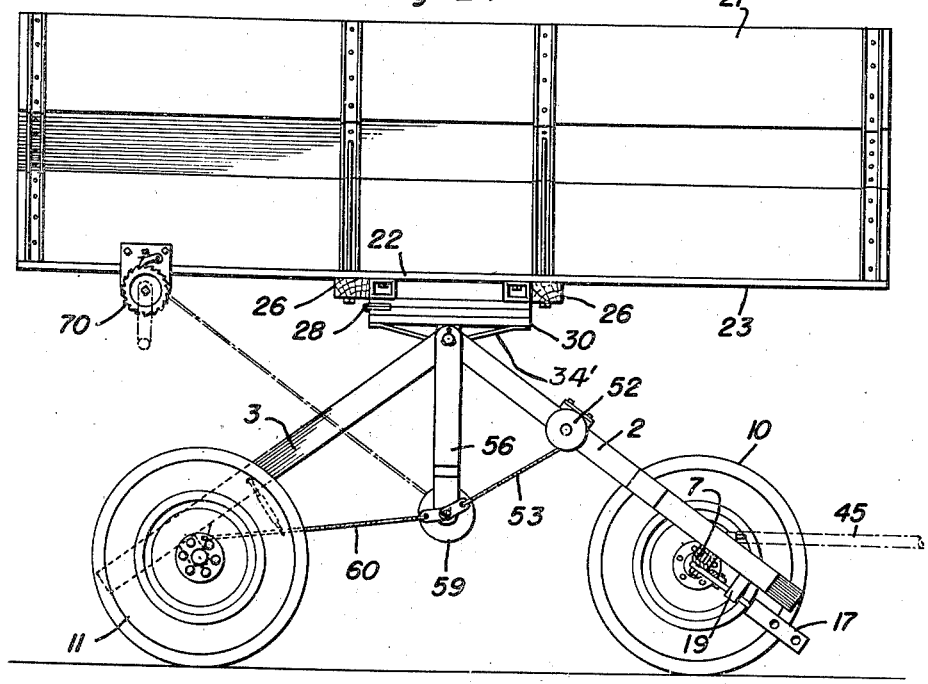
Figure 2 is a similar view with the body elevated, or lifted, to lift a load preparatory to tilting for dumping the load.
Figure 6:
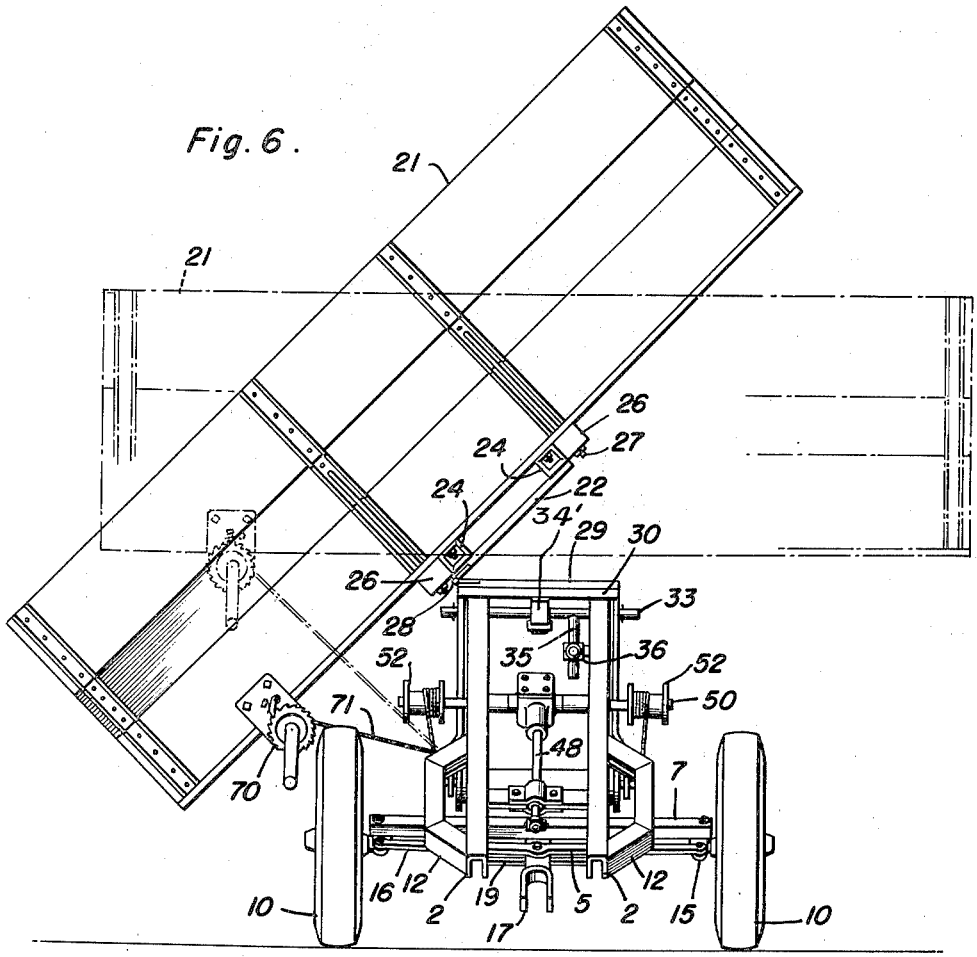
Figure 6 is a view in front elevation with the body elevated, or lifted, and tilted to dump a load to one side of the vehicle.
Figure 7:
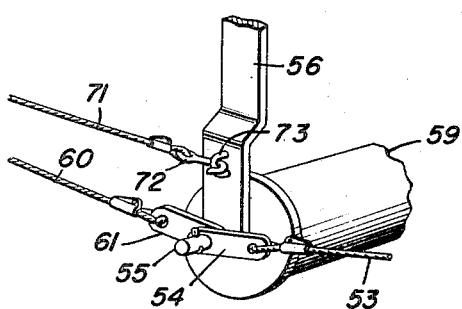
Figure 7 is a fragmentary view in perspective of the thrust arms and ground engaging roller, together with the cables.
Figure 8:
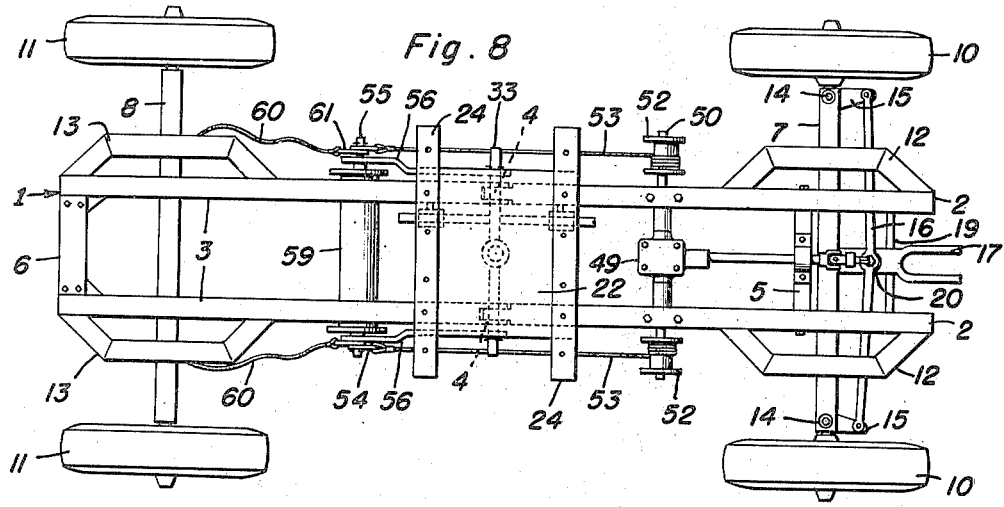
Figure 8 is a view in plan with the body removed.

Referring now to the drawings by numerals, and first to Figures 1 to 8 thereof, my improved vehicle comprises a chassis frame 1 including front and rear pairs of channel side bars 2, 3 pivotally connected together in the transverse center of said frame by upwardly breaking hinge joints represented by dotted lines at 4 in Figure 8, the arrangement being such that said pairs of side bars 2, 3 may be swung upwardly from horizontal position into upwardly converging relation to break the chassis frame upwardly in a pair of sections. A front cross bar 5 connects the front pair of side bars 2 and a rear cross bar 6 connects the rear side pair 3. Front and rear axle bars 7, 8 extend beneath the front and rear pairs of side bars 2, 3 and are suitably secured thereto with front and rear ground wheels 10, 11 thereof. Front and rear pairs of outwardly bowed brace bars 12, 13 on the front and rear pairs of side bars 2, 3 brace the same to the axle bars 7, 8. The front ground wheels 10 are steering wheels carried by steering knuckles 14 with the steering arms 15 connected by a tie rod 16. A hitch bar 17 for coupling to a tractor, not shown, is pivoted, as at 18, on the front axle bar 7 to swing laterally thereon and on a yoke bar 19 suitably connected to the front pair of side bars 2. The tie rod 10 is pivoted centrally thereof to the hitch bar 17, as at 20, for steering the front wheels 10 when the hitch bar 17 is swung laterally.

Surmounting the chassis frame 1 is a wagon type body 21, preferably of hopper form, with suitable end gates, not shown. The body 21 is mounted centrally thereof on the chassis frame 1 to be elevated, or lifted, by swinging of the pairs of side bars 2, 3 into upwardly converging relation and also to be rotated and tilted as follows:

A rectangular body supporting plate 22 is provided beneath the body 21 and centered in the longitudinal center of the bottom 23 of said body with parallel hollow beams 24 suitably fixed thereon and bolted, as at 25, to said bottom 23 to extend transversely thereof between a pair of transverse cleats 26 bolted, as at 27, to said bottom 23 beneath the same. The body supporting plate is hinged at one edge, as at 28, to the corresponding edge of a rectangular horizontal turntable 29 of the same size as said plate 22 and underlying the same to support said plate 22 in horizontal position and maintain the body 23 horizontal. The turntable 29 is supported on a bearing plate 30 and has an axial stem 31 depending through and journaled in the center of the bearing plate 30 and in a bottom, central socket 32 on said plate 30 depending therefrom midway between the hinge joints 4 and forming an integral part of a cross rod 33 extending through the axis of the hinge joints 4 and thereby providing a common pivot of said joints. The ends of the cross bar 33 extend outwardly beyond the sides of the chassis frame 1 for a particular purpose presently seen. A nut 34 on the stem 31 retains the same in said socket 32. Brace bars 34' extending from the socket 32 to the bearing plate 30 stabilize said plate. The bearing plate 30 is of a width to overlap the side bars 2, 3, and in the horizontal aligned position of said bars, said plate 30 bears downwardly against said bars at opposite sides of said joints 4 and prevents said joints from breaking downwardly. The hinge 28 is at one side of the transverse center of the body 21 so that said body is overbalanced normally to assume a position of rest in horizontal position on the turntable 29.

As will now be seen, with the bearing plate 30 maintained horizontal, and hence the turntable 29 and the body supporting plate 22 imposed flat on the turntable 29, to maintain the body 21 horizontal, swinging of the front and rear pairs of side bars 22, 23 in different degree into upwardly converging relation to break the chassis frame 1 upwardly will elevate or lift the body 21 in horizontal position to different heights or levels, at which said body 21 may be rotated in a complete circle, while horizontal, and thence tilted vertically on the hinge 28 to dump from one end of the body at selected points in the circle.

Stabilizing means is provided for maintaining the bearing plate 30, and hence the turntable 29, horizontal and comprising the following: A stabilizing stem 35 depends from the cross rod 33 and on which a collar 36 is slidable, said collar forming an integral part of a horizontal stabilizing slide rod 37 extending alongside one side of the chassis frame 1 with opposite ends slidable in a pair of sleeves 38 pivoted, as at 39, to the front and rear side bars 2, 3 on one side of the chassis frame 1 to swing about axes parallel to the axis of the cross bar 33, which is to say of the hinge joints 4. As will be obvious, when the front and rear pairs of side bars 2, 3 are swung relatively, vertically, the stabilizing stem 35 is maintained vertical by endwise sliding of the stabilizing slide rod 37 in the sleeves 38 which pivot to maintain said rod 37 horizontal and said stem vertical while compensating for relative swinging of the front and rear pairs of side bars 23 out of horizontal and into angular relation.

Power operative lift means for swinging the front and rear pairs of side bars 2, 3 upwardly to correspondingly break the chassis frame 1 forms in conjunction with the bars 2, 3 elevating, or lifting means, for the body 1. The power operative lift means comprises a longitudinal drive shaft 45 extending forwardly of the vehicle and adapted for coupling, in any suitable manner, to the rear power take-off shaft, not shown, of the tractor. A universal joint 46 coupled to said shaft 45, as at 47, connects the same to the front end of the driven shaft 48 extending rearwardly between the front pair of side bars 2 with one end journaled in the cross bar 5 and the other end extending into a gear housing 49 extending between and suitably fixed to said bars 2. A reel shaft 50 extends through said housing 49 and transversely to said side bars 2 and which is suitably journaled and extends at its ends outwardly beyond said bars 2. A bevel gear reduction drive 51 is provided in said housing 49 between said shaft 48 and the reel shaft 50. A pair of cable winding reels 52 are fixed on the ends of said shaft 50 with cables 53 suitably fixed at one end thereto for winding thereon.

The other ends of the cables 53 are connected by pivoted links, as at 54, to opposite ends of a cross shaft 55 extending through the lower ends of a pair of thrust bars 56 pivotally suspended at opposite sides of the chassis frame 1 on the cross rod 33 and retained on said rod by cotter pins 57 with spacing washers 58 between the same and the sides of the chassis frame 1. A ground engaging roller 59 is rotatable on the cross shaft 55.

The thrust bars 56 are substantially longer than the distance between the cross bar 33 and the ground, when the front and rear pairs of side bars 2, 3 are horizontal, so that normally the ground roller 59 will ride the ground in trailing relation to the pivotal axes of the hinge joints 4 and said thrust bars 56 normally incline rearwardly and downwardly of said axes. A pair of cables 60 are connected at one end, by pivoted links, as at 61, to the ends of the cross shaft 55 to extend rearwardly therefrom. The other ends of the cables 60 are connected, as at 62, to gusset plates 63 on the rear axle bar 8. The cables 60 are normally slack and of a length to permit the thrust bars 56 to be swung forwardly a limited distance on the cross rod 33 about the axis of the hinge joints 4. Turnbuckle guide rods 64 pivoted on the rear pair of side bars 3, as at 65, act to hold the cables 60 off the ground when said cables are slack.

As will be obvious from the foregoing description of the power operative lift means, if the cables 53 are wound up on the reels 52, the cross shaft 55 will be pulled forwardly with the ground engaging roller 59 rolling over the ground until the thrust bars 56 have been swung forwardly into their limit of swinging movement in that direction as established by the cables 60, and during this operation thereof the thrust bars 56 will gradually approach vertical positions and thrust upwardly against the cross shaft 33 to lift said shaft and elevate, or lift, the body 21 a given distance, the pairs of side bars 2, 3 being thus swung into upwardly converging relation to break the chassis frame upwardly, the front and rear pairs of ground wheels 10, 11 rolling toward each other in compensating movement. Thus, the body 21 is elevated, or lifted, initially a given distance. At this point further winding up of the cables 53 will lift the thrust bars 56 upwardly, bodily, and the ground engaging roller 59 off the ground, until the cables 53 reach near alignment with the cables 60 whereby the thrust bars 56 will exert upward thrust against the cross shaft 33 to elevate, or lift the body 21 an additional distance.

A hand winch 70 is mounted on one side of the body 21 below the bottom 23 for winding up a pull cable 71 to tilt the body 21 on the hinge 28 into dumping position, for instance, as shown in broken lines in Figure 6, or in Figure 3. The pull cable 71 has an end hook 72 attachable, selectively, in staples 73 on the lower ends of the thrust bars 56, and one of which is shown in Figure 7.

In operating the described embodiment of my invention, to elevate and dump a load, the body 21 is elevated in the manner and by the means described and the body 21 is then rotated by hand through the medium of the turntable 29 into the desired position for dumping, either forwardly or rearwardly of the vehicle, or to either side of the same. The pull cable 71 is then connected to the appropriate staple 73 and the hand winch 70 operated to cause the body 21 to be tilted on the hinge 28 into dumping position. As will be seen, the body 21 may be tilted in the vertical median plane of the chassis frame 1, either rearwardly, as shown by broken lines in Figure 3, or to dump forwardly of the vehicle, or, as shown by broken lines in Figure 6, it may be tilted crosswise of the chassis frame 1 to dump on one side thereof. Obviously, it may be tilted crosswise of the chassis frame 1 to dump on the other side thereof. The dump body 21 is restored, by hand, to horizontal normal position to prevent the overbalanced condition of the same from causing it to swing too suddenly into horizontal position. The body 21 may be lowered by reversing the power take-off from the tractor to permit the elevated parts to lower by gravity, the thrust bars 56 being swung rearwardly by hand to assume normal position as soon as the roller 59 engages the ground and is forced rearwardly over the same by the weight of the descending parts.

Figure 9:
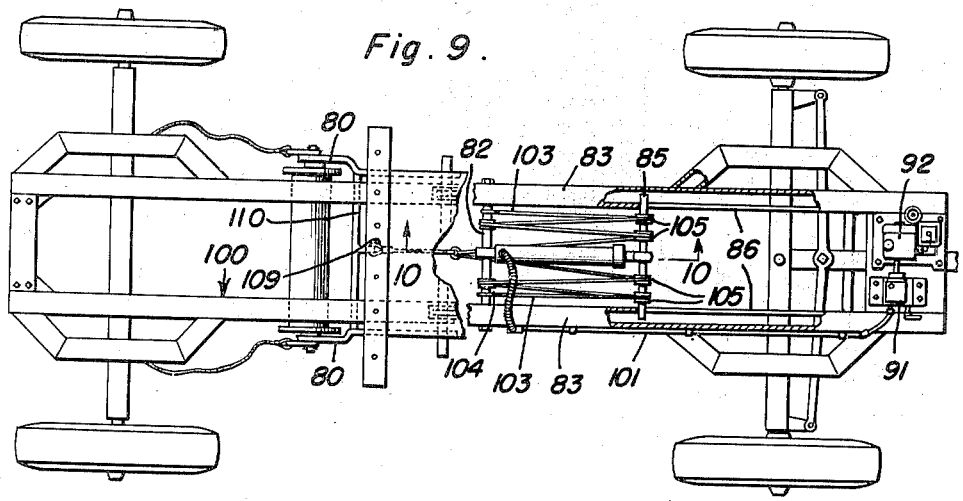
Figure 9 is a similar view partly broken away and shown in section of a modified embodiment of my invention.
Figure 10:
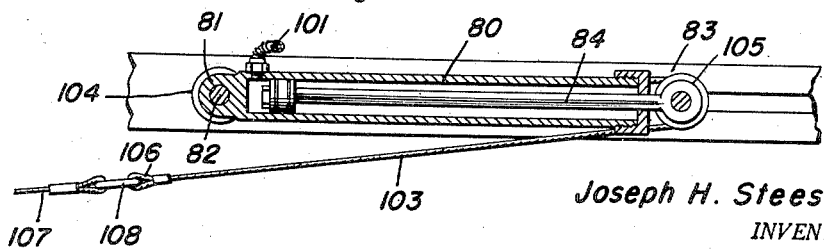
Figure 10 is a fragmentary view in longitudinal section taken on the line 10—10 of Figure 9 and drawn to a larger scale.

In the modified embodiment of the invention illustrated in Figures 9 and 10, hydraulic power means is utilized to swing the thrust arms, designated 79, to impart initial and additional elevation, or lift, to the body. The hydraulic means comprises a hydraulic horizontal cylinder 80 having a rear end eye 81 by which said cylinder is mounted on a fixed cross shaft 82 extending between the front pair of side bars 83, the piston rod 84 of said cylinder being similarly connected to a cross shaft 85 slidable at its ends in longitudinal slots 86 provided in said side bars 83 to permit the piston rod 89 to reciprocate forwardly and rearwardly. Hydraulic pressure is introduced into one end of said cylinder 80 to drive the piston rod 84 forwardly by a suitable compressor 91 driven by a motor 92, both suitably mounted on the front end of the chassis frame 100, a pressure line 101 extending from the compressor 91 to said end of the hydraulic cylinder 80. A pressure relief valve 102 provides for relieving pressure in said cylinder 80. A pair of cables 103 are fixed at corresponding ends thereof to the fixed cross shaft 82 and trained back and forth around pulleys 104, 105 on said cross shafts 82, 85 with said cables terminating under the hydraulic cylinder 80 in a loop 106 to which a rearwardly extending pull cable section 107 is connected at one end, as at 108, with its other end connected, as at 109, to a cross shaft 110 extending between the thrust bars 79.

Referring to the operation of the modified embodiment of the invention, as the piston rod 84 moves forwardly, the pulleys 105 are carried forwardly to cause the pairs of cables 103 to pull on the pull cable section 107 and swing the thrust bars 79 in the same manner and for the same purpose as described with reference to the preferred embodiment of the invention. When pressure is relieved in the hydraulic cylinder 80, the parts of the hydraulic mechanism are returned to normal position as the thrust bars 79 assume normal positions and by pull exerted by said bars against the cable section 107 and hence against the pair of cables 103. Otherwise, then, as described, the modified embodiment of the invention is the same as the preferred embodiment.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

Having described the invention, what is claimed as new is:

1. In a vehicle of the class described, a wheel supported chassis frame including front and rear sections pivotally connected together in the transverse center of said frame for swinging into upwardly converging relation, a load receiving body surmounting said frame, means to mount said body on said frame for lifting in horizontal position by such upward swinging of said sections, and power operative means for swinging said sections, the means first-mentioned comprising a turntable rotatable about a verticle axis whereby said body is adapted to be rotated in horizontal position above said frame.

2. In a vehicle of the class described, a wheel supported chassis frame including front and rear sections pivotally connected together in the transverse center of said frame for swinging into upwardly converging relation, a load receiving body surmounting said frame, means to mount said body on said frame for lifting in horizontal position by such upward swinging of said sections, and power operative means for swinging said sections, the means first mentioned comprising a turntable rotatable about a vertical axis whereby said body is rotatable in horizontal position over said frame and on which said body is tiltably mounted.

3. In a vehicle of the class described, a wheel supported chassis frame including front and rear sections pivotally connected together in the transverse center of said frame for swinging into upwardly converging relation, a load receiving body surmounting said frame, means to mount said body on said frame for lifting in horizontal position by such upward swinging of said sections, and power operative means for swinging said sections, the means first mentioned comprising a turntable rotatable about a vertical axis whereby said body is rotatable in horizontal position over said frame, and a hinge connection between said turntable and body providing for vertical tilting of said body vertically.

4. In a vehicle of the class described, a wheel supported chassis frame including front and rear sections pivotally connected together in the transverse center of said frame for swinging into upwardly converging relation, a load receiving body surmounting said frame, means to mount said body on said frame for lifting in horizontal position by such upward swinging of said sections, and power operative means for swinging said sections, the means first mentioned comprising a turntable rotatable about a vertical axis whereby said body is rotatable in horizontal position over said frame, and a hinge connection between said turntable and body providing for swinging tilting of said body vertically about a horizontal axis offset to one side of the transverse center of said body whereby said body is overbalanced toward horizontal position.

5. In a vehicle of the class described, a wheel supported chassis frame including front and rear sections pivotally connected together in the transverse center of said frame for swinging into upwardly converging relation, a load receiving body surmounting said frame, means to mount said body on said frame for lifting in horizontal position by such upward swinging of said sections, and power operative means for swinging said sections comprising a ground engaging device pivoted on said frame coaxially with the pivotal connections of said sections for swinging in rolling engagement with the ground to exert upward thrust against said frame at the pivotal connections of said sections.

6. In a vehicle of the class described, a wheel supported chassis frame including front and rear sections pivotally connected together in the transverse center of said frame for swinging into upwardly converging relation, a load receiving body surmounting said frame, means to mount said body on said frame for lifting in horizontal position by such upward swinging of said sections, power operative means for swinging said sections comprising a ground engaging device pivoted on said frame coaxially with the pivotal connections of said sections for swinging in rolling engagement with the ground to exert upward thrust against said frame at the pivotal connections of said sections, and wind up cable devices for swinging said ground engaging devices.

7. In a vehicle of the class described, a wheel supported chassis frame including front and rear sections pivotally connected together in the transverse center of the frame for swinging from horizontal aligned position into upwardly converging relation, a load receiving body surmounting said frame, means to mount said body on said frame in the transverse center of the frame for lifting in horizontal position by such upward swinging of said sections, a pair of thrust bars pivoted on opposite sides of said frame coaxially with the pivotal connections of said sections to depend therefrom at an angle to the vertical when said sections are in horizontal aligned position, a roller carried by said arms between the same for engaging the ground, and power means for swinging said arms into vertical position with said roller travelling over the ground whereby said arms are caused to exert upward thrust against said sections to swing the same upwardly.

8. In a vehicle of the class described, a wheel supported chassis frame including front and rear sections hinged together in the transverse center of the frame for swinging upwardly into converging relation, a turntable mounted on said frame in the transverse center thereof to be lifted in horizontal position by such swinging of said sections, a load receiving body mounted on said turntable for rotation in horizontal position, the mounting for the body including a pivotal connection whereby said body is tiltable vertically on the turntable, power means for swinging said sections, and cable wind up means operative to tilt said body.

9. In a vehicle of the class described, a wheel supported chassis frame comprising a pair of front and rear sections pivotally connected in the transverse center of the frame for swinging upwardly into converging relation, a load receiving body on said frame elevated by such swinging of said sections, and power operative means to swing the sections comprising a device pivoted on said frame for swinging in rolling engagement with the ground to exert upward thrust against said frame at the pivotal connections of said sections, and hydraulically tensioned pull cables for swinging said device.

JOSEPH H. STEES.

REFERENCES CITED

The following references are of record in the file of this patent:

UNITED STATES PATENTS

| Number | Name | Date |
| --- | --- | --- |
| 97,846 | Willson | Dec. 14, 1869 |
| 1,606,796 | Jones | Nov. 16, 1926 |
| 2,429,723 | Kelley | Oct. 28, 1947 |
| 2,465,244 | Lutz | Mar. 22, 1949 |

FOREIGN PATENTS

| Number | Country | Date |
| --- | --- | --- |
| 580 | Great Britain | of 1902 |
| 393,028 | Germany | of 1924 |